US007653518B2

(12) United States Patent
Kulkarni

(10) Patent No.: US 7,653,518 B2
(45) Date of Patent: Jan. 26, 2010

(54) SYSTEM AND METHOD FOR GENERATING MATCHED CONTOUR PROFILES

(75) Inventor: Santosh V. Kulkarni, Commerce Township, MI (US)

(73) Assignee: Autodesk, Inc., San Rafael, CA (US)

( * ) Notice: Subject to any disclaimer, the term of this patent is extended or adjusted under 35 U.S.C. 154(b) by 367 days.

(21) Appl. No.: 11/338,224

(22) Filed: Jan. 24, 2006

(65) Prior Publication Data
US 2006/0202983 A1 Sep. 14, 2006

Related U.S. Application Data

(60) Provisional application No. 60/661,635, filed on Mar. 14, 2005.

(51) Int. Cl.
*G06F 17/50* (2006.01)
*G06T 15/00* (2006.01)
*G06T 17/00* (2006.01)

(52) U.S. Cl. ................................. 703/1; 345/19; 345/20
(58) Field of Classification Search ..................... 703/1; 345/419, 420
See application file for complete search history.

(56) References Cited

U.S. PATENT DOCUMENTS

| 5,556,805 | A | * | 9/1996 | Tanizawa et al. ............. 438/637 |
| 5,847,956 | A |  | 12/1998 | Bronfeld et al. |
| 6,049,756 | A | * | 4/2000 | Libby .......................... 701/301 |
| 6,317,864 | B1 | * | 11/2001 | Kikuchi et al. ................ 716/11 |
| 6,571,146 | B1 |  | 5/2003 | Dennehy |
| 6,654,654 | B1 |  | 11/2003 | Subrahmanyam et al. |
| 7,312,141 | B2 | * | 12/2007 | Dunham et al. ............. 438/597 |
| 2002/0120356 | A1 | * | 8/2002 | Takahashi et al. ............. 700/98 |
| 2004/0193298 | A1 |  | 9/2004 | Yamada et al. |
| 2004/0234116 | A1 | * | 11/2004 | Bi et al. ....................... 382/132 |

FOREIGN PATENT DOCUMENTS

EP 0 681 243 A1 8/1995

OTHER PUBLICATIONS

International Search Report, Aug. 17, 2007.
Gursoz, et al., "Boolean Set Operations On Non-Manifold Boundary Representation Objects", Computer-Aided Design, Jan. 1, 1991. vol. 23 No. 1. London, GB. pp. 33-39.
Chen, et al., "On Editability of Feature-Based Design", Computer-Aided Design, Dec. 1,1995, vol. 27, No. 12. Elsevier Science Ltd., GB. pp. 905-914.
Supplementary European Search Report, Jul. 28, 2008.

* cited by examiner

*Primary Examiner*—Paul L Rodriguez
*Assistant Examiner*—Andre Pierre Louis
(74) *Attorney, Agent, or Firm*—Patterson & Sheridan, LLP

(57) ABSTRACT

A method for generating matched contour profiles includes the steps of trimming or extending an input wire to create a modified input wire and slicing a solid part in the plane of the modified input wire to create an intersection wire. The method also includes the steps of imprinting the modified input wire and the intersection wire on a disk to create one or more faces of interest, determining which faces of interest constitute matched contour faces, and extracting edges of an identified matched contour face to create a closed wire. Matched contour profiles enable solid modeling programs to generate solid models that are less prone to failure because the matched contour profile automatically adapts to changes in the shape of the solid model.

18 Claims, 6 Drawing Sheets

200

SYSTEM AND METHOD FOR GENERATING MATCHED CONTOUR PROFILES

CROSS-REFERENCE TO RELATED APPLICATIONS

This application claims benefit of U.S. provisional patent application Ser. No. 60/661,635, filed on Mar. 14, 2005, which is herein incorporated by reference.

BACKGROUND OF THE INVENTION

1. Field of the Invention

Embodiments of the present invention generally relate to Computer-Aided Design and more specifically to a system and method for generating matched contour profiles.

2. Description of the Related Art

Solid modeling software enables the design and manipulation of three-dimensional parts by using shapes and feature descriptors to model a solid part. Typically the shape of the solid part is modified by means of adding a contour to the part and using the contour as a guide to add or remove material. In this manner, a complex part may be designed using relatively simple parts and simple contours.

A problem commonly arises when changing the shape of the solid part. Contour shapes are not automatically adapted to changes in the shape of the solid part, and since the solid part features can depend on the shape of the contour, changing the shape of the solid part can result in a failure of the solid model. The failure could propagate to other design operations that are dependent on the solid part in question. The typical solution is that each time the shape of the solid part changes, the designer has to manually modify shape or contour constraints to repair the solid model. This workflow can be tedious and time consuming when the shape of the part is being modified frequently.

As the foregoing illustrates, what is needed in the art is a way to generate contours that automatically adapt to changes made to the shape of the solid part.

SUMMARY OF THE INVENTION

A method for generating matched contour profiles includes the steps of trimming or extending an input wire to create a modified input wire and slicing a solid part in the plane of the modified input wire to create an intersection wire. The method also includes the steps of imprinting the modified input wire and the intersection wire on a disk to create one or more faces of interest, determining which faces of interest constitute matched contour faces, and extracting edges of an identified matched contour face to create a closed wire.

Embodiments of the invention allow a user to create solid models that are less prone to failure. As the shape of the part changes, the closed wire generated from the identified matched contour face automatically adapts to the new shape of the solid part. Thus, the user avoids having to correct aspects of a given solid part generation process each time the underlying solid part is altered.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention are generally directed to a system and method for generating matched contour profiles in solid part modeling programs used to generate models of three-dimensional (3D) solid bodies. In one embodiment an input wire is used by the solid part modeling program to generate a matched contour profile.

In computer-aided design, the term, "boundary representation," refers to information specifying how to generate a solid part model based on geometric and topological properties of the solid body. The information may provide a hierarchy of topological objects that define the boundaries of successively simpler elements used to define the model of the solid body. At a high level, each solid part may include of a set of one or more "faces." A face is used to define an infinitely thin boundary between what resides within the solid part and what resides outside of the solid body. For example, a 3D solid part with the shape of a cube includes six faces, each one representing one side of the cube. Additionally, each face may be defined using two "half-faces," one to indicate which side of the face is on the outside of the solid part and another to indicate which side is inside the solid body. In turn, the boundary of each face may be defined by one or more "edges." An edge can be envisioned as an infinitely thin wire of a particular 2D shape. Edges may have both linear and curved shapes. In turn, edges may be bounded by zero, one, or two "vertices." Vertices connect a physical point as a termination to an edge.

Figure 2A:
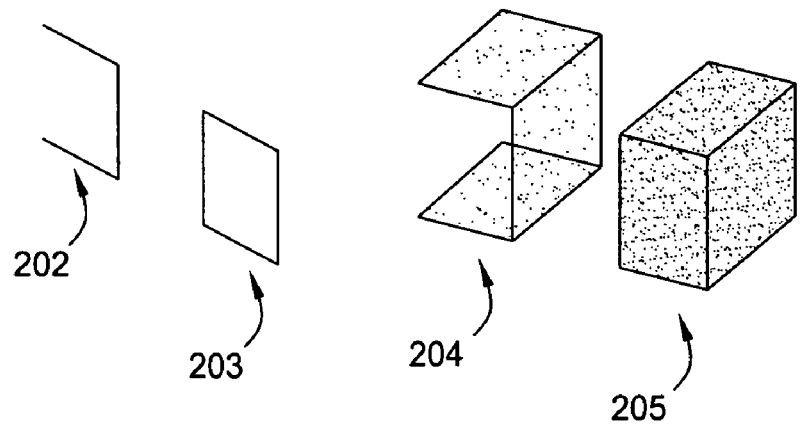
FIG. 2A illustrates an example of an open wire and a closed wire, according to one embodiment of the invention.

Generally, a "wire" body may be thought of as being similar to an edge. Also, the terms wire and profile may be used interchangeably in the art. FIG. 2A illustrates an example of an open wire and a closed wire. As shown, open wire 202 includes distinct start and end point (or vertices). For closed wire 203, the start and end points coincide, and these points may be defined as any one of the four vertices that are part of closed wire 203. Modeling operations performed by a geometry kernel (or equivalent functional component) used to create solid bodies typically require the use of a closed wire. Such operations include extrusions, revolutions, translations, rotations, etc., of the closed wire to generate a solid body. For example, solid part 205 may be created using closed wire 203 in an extrusion operation. By contrast, extruding open wire 202 fails to produce a solid body, and instead results in a surface body 204, i.e., a 3D shape with no volume. This example illustrates that generally, before a solid part may be created from an open wire, the open wire needs to be converted to a closed wire.

The use of open wires in wire-based operations such as extrusions, revolutions, etc., may be limited to creating surface bodies, unless the wire can be closed. In one embodiment, a matched contour algorithm is applied to an open wire and a solid part to create a closed wire used for wire-based modeling operations. The matched contour algorithm may be used to generate a closed wire from the intersection of the wire and a cross-section of the solid body. The closed wire generated from the intersection may then be used by any wire-based operation provided by the modeling kernel to add material to, or remove material from, an existing solid body. The matched contour profile captures both the shape of the open wire supplied to the matched contour algorithm, and the shape of the solid used to create the matched contour profile.

Figure 1:
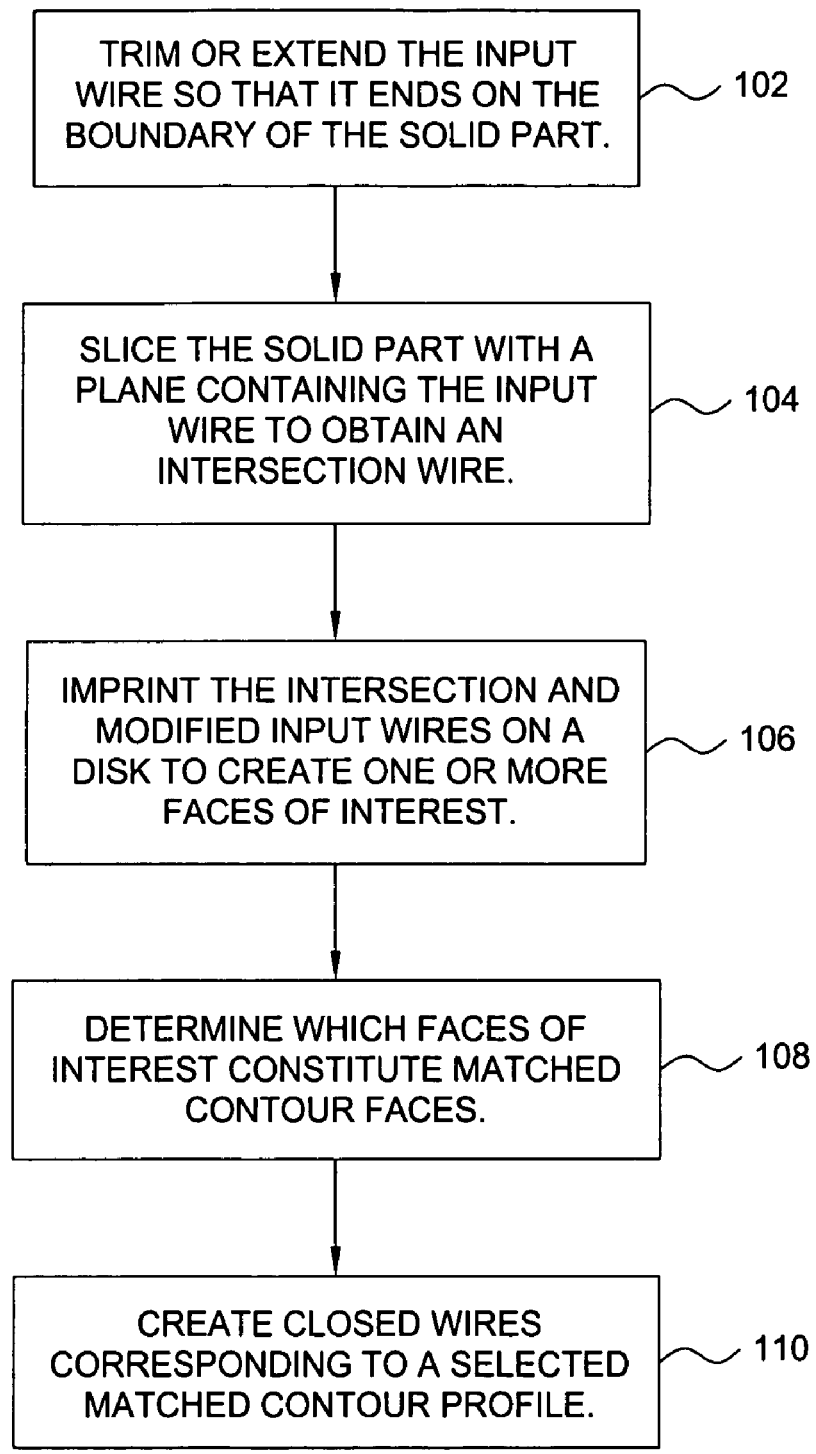
FIG. 1 is a flowchart of method steps for generating matched contour profiles, according to one embodiment of the present invention.

FIG. 1 is a flowchart of method steps for generating matched contour wires, according to one embodiment of the invention. Persons skilled in the art will understand that any system configured to perform the method steps illustrated in FIG. 1, in any order, is within the scope of the present invention.

Figure 2B:
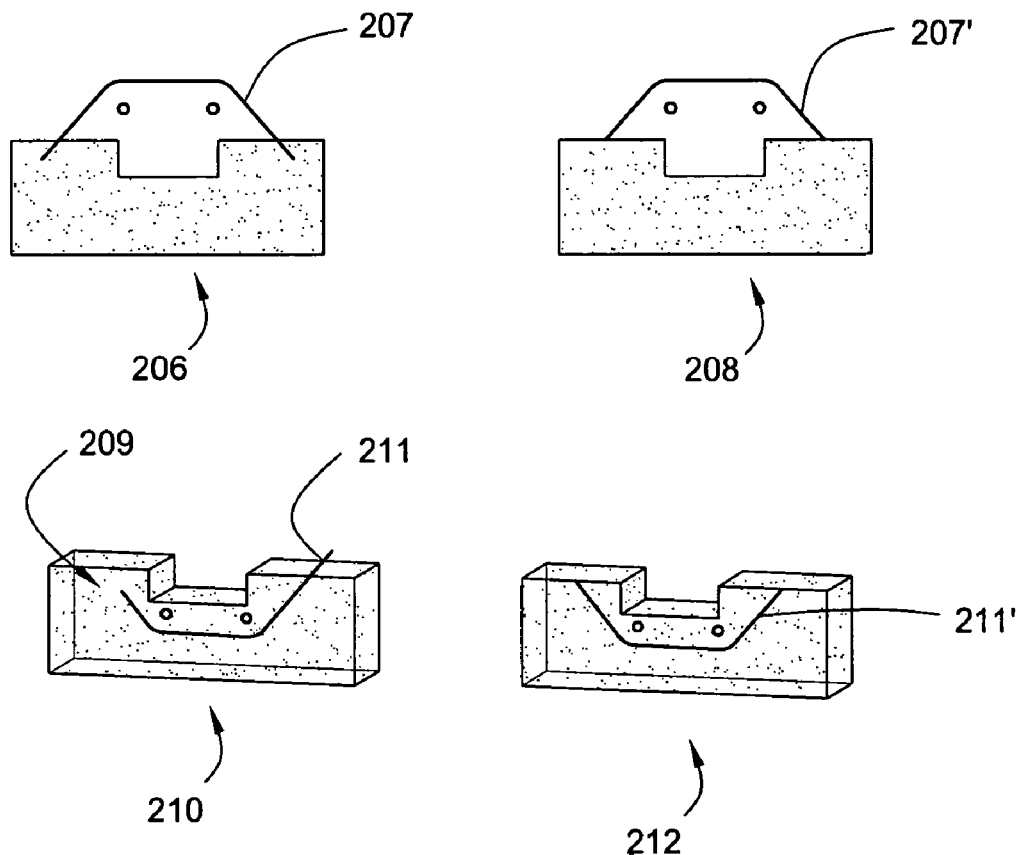
FIG. 2B illustrates an input wire before and after being trimmed/extended to coincide with the face of a solid body, according to one embodiment of the invention.

At step 102, an input wire is applied against a solid body, and trimmed (or extended) as necessary so that the vertices of the input wire coincide with a face of the solid body. In one embodiment, the input wire is a wire object supplied by a user. The placement of the wire by the user may require the shape of the wire to be modified by the geometry kernel so that the terminating points (vertices) of the wire coincide with a face of the solid body. FIG. 2B illustrates an input wire before and after being trimmed/extended to coincide with a face of a solid body, according to one embodiment of the invention. As shown, the topology of wire 207 extends into solid part 206 at both ends of wire 207. A Boolean subtraction operation may be performed using wire 207 and the solid part 208 resulting in the trimmed wire 207'. Solid part 208 shows wire 207' having been trimmed to coincide with the boundary of solid part 208. Similarly, solid part 210 shows wire 211 protruding from one of the faces of solid part 210. A Boolean intersection operation may be performed between the wire and solid body, resulting in the trimmed wire 211'. Also, vertex 209 fails to extend to the surface boundary solid part 210. After a trim operation and an extend operation has been performed on wire 211, both ends coincide with a face of solid part 212.

Figure 2C:
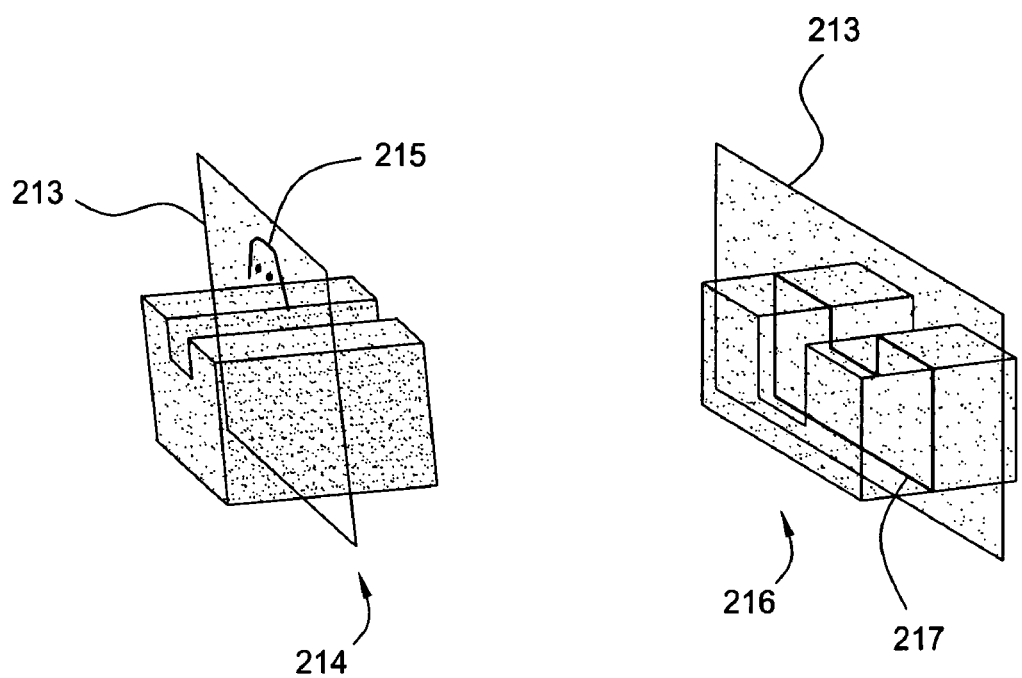
FIG. 2C illustrates a two-dimensional plane intersecting a solid body, according to one embodiment of the invention.

At step 104, the geometry kernel may be configured to slice the solid part using a plane that includes the input wire. The result is an intersection wire. In one embodiment, the intersection wire is formed from the cross-section of the solid body. The edges of the intersection wire are determined from the intersection of the slicing plane and the faces of the solid body. FIG. 2C illustrates a two-dimensional plane 213 intersecting a solid part 214, according to one embodiment of the invention. As shown, plane 213 includes an input wire 215. This plane intersects a solid part 214. The resulting intersection wire 217 is created from the intersection of the plane 213 and the faces of the solid part 214.

Figure 2D:
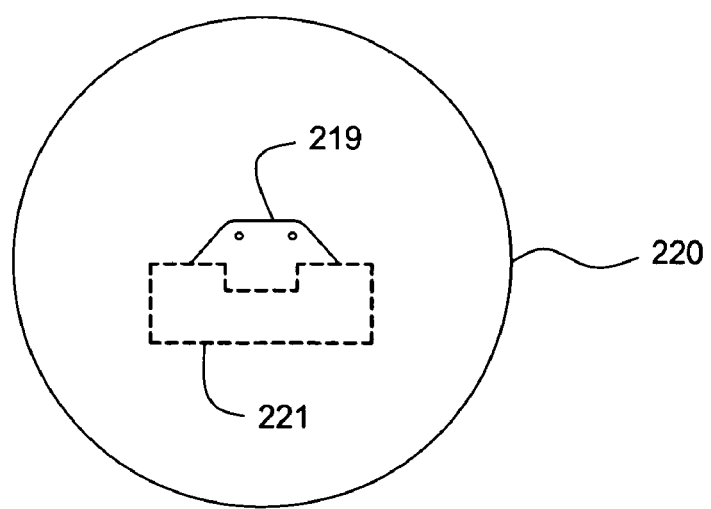
FIG. 2D illustrates an input wire and intersection wire imprinted onto a disk object, according to one embodiment of the invention
Figure 2E:
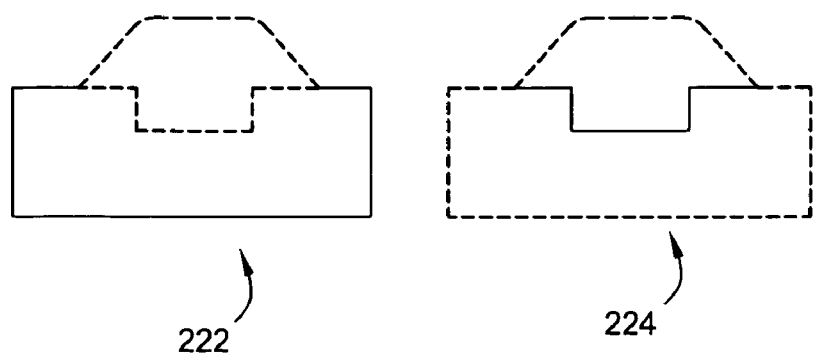
FIG. 2E illustrates a set of faces of interest determined from an input wire and solid part, according to one embodiment of the invention.
Figure 2E:
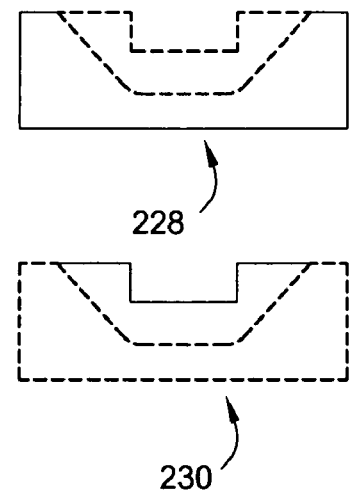

At step 106, the geometry kernel imprints the input wire and intersection wire on a disk. FIG. 2D illustrates a representation of input wire 219 and intersection wire 221 imprinted onto a disk 220, according to one embodiment of the invention. Imprinting the input wire 219 and intersection wire 221 onto disk 220 results in one or more faces of interest. As used herein, a "face of interest" is a face constructed using edges obtained from either the intersection wire 221 or the extended/trimmed input wire 219. As shown in FIG. 2E, several faces of interest may be generated depending on the location of the original input wire relative to the solid body. Faces of interest 222 and 224 (shown using dashed lines) correspond to faces of interest generated from solid part 208 and input wire 207', Similarly, faces of interest 228 and 230 correspond to faces of interest generated from solid part 212 and input wire 211'.

At step 108, the geometry kernel may be configured to analyze the faces of interest generated in step 106. Any face of interest that includes at least one edge from the intersection wire and at least one edge from the input wire is considered to be a matched contour face. The edges of a matched contour face may be used to generate a matched contour wire, as these edges capture the shape of the input wire and the contour of the solid body. If more than one matched contour is identified from the faces of interest, the user may be prompted to select which matched face to use in generating a matched contour wire.

Figure 2F:
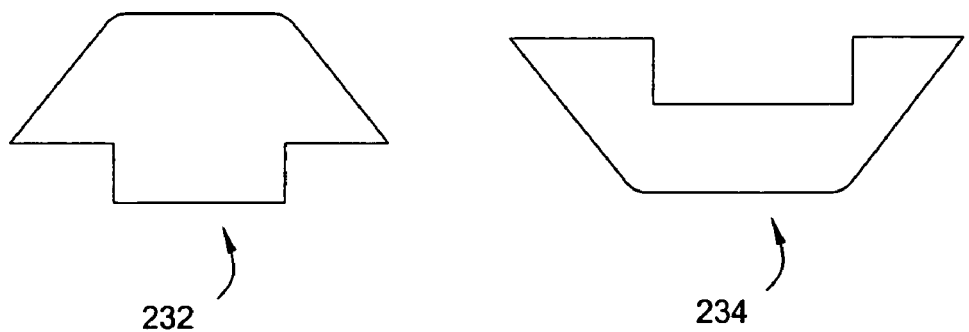
FIG. 2F illustrates a matched contour wire generated from one of the faces of interest, according to one embodiment of the invention.

At step 110, the geometry kernel may be configured to generate a closed wire from a chosen matched contour face. In one embodiment, the edges of the chosen face of interested are used to generate a closed wire. For example, FIG. 2F show examples of matched contour wires 232 and 234 selected from the faces of interest shown in FIG. 2E. More specifically, matched contour wire 232 results from face of interest 224 and matched contour wire 234 results from face of interest 228.

In one embodiment, the matched contour algorithm enables the matched contour wire to automatically adapt to changes in the solid part from which it was created. The matched contour algorithm does not reference any specific entities of the solid part (such as faces or edges) while computing the closed wire. Instead, the matched contour algorithm imprints an intersection wire using the input wire and a cross-sectional plan of the solid body. This allows a matched contour wire to respond to changes made to the solid body.

Figure 2G:
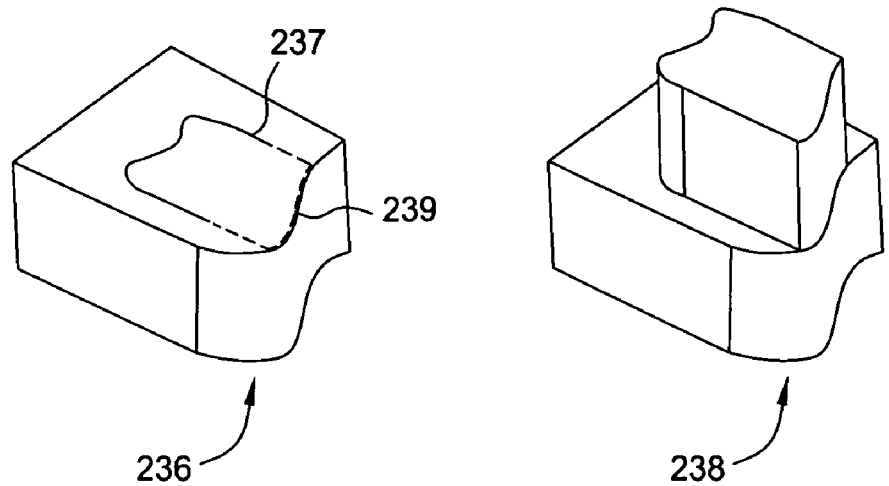
FIG. 2G illustrates solid part operations performed using a matched contour wire, according to one embodiment of the invention.
Figure 2G:
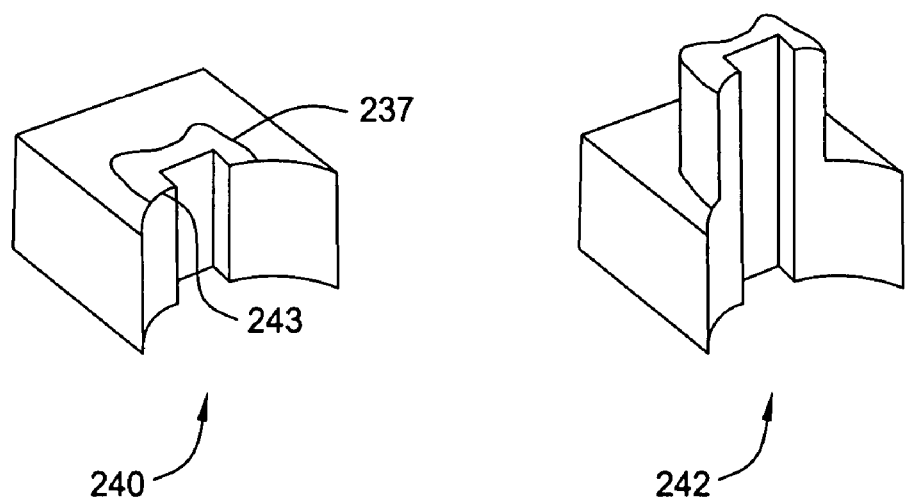

For example, FIG. 2G illustrates solid part operations performed using a matched contour wire, according to one embodiment of the invention. As shown, solid part 236 includes input wire 237. Using the matched contour algorithm, the ends of wire 237 may be extended to intersect the boundary surface of solid part 237 and to generate a matched contour wire 239. The geometry kernel may perform an extrusion operation using the matched contour wire 239 to create solid part 238. If the user subsequently changes the topology of solid part 236 to create solid part 240, the modeling software may perform the matched contour algorithm described herein to generate a new matched contour wire 243. As shown, the changes reflected in solid part 240 require the input wire 237 to be trimmed to intersect the boundary surface of solid part 240. The resulting matched contour wire 243 may be used to perform the extrusion operation on solid part 240, resulting in solid part 242. Thus, embodiments of the invention allow the user to change the topology and geometry of the original solid body without jeopardizing downstream modeling operations.

Figure 3:
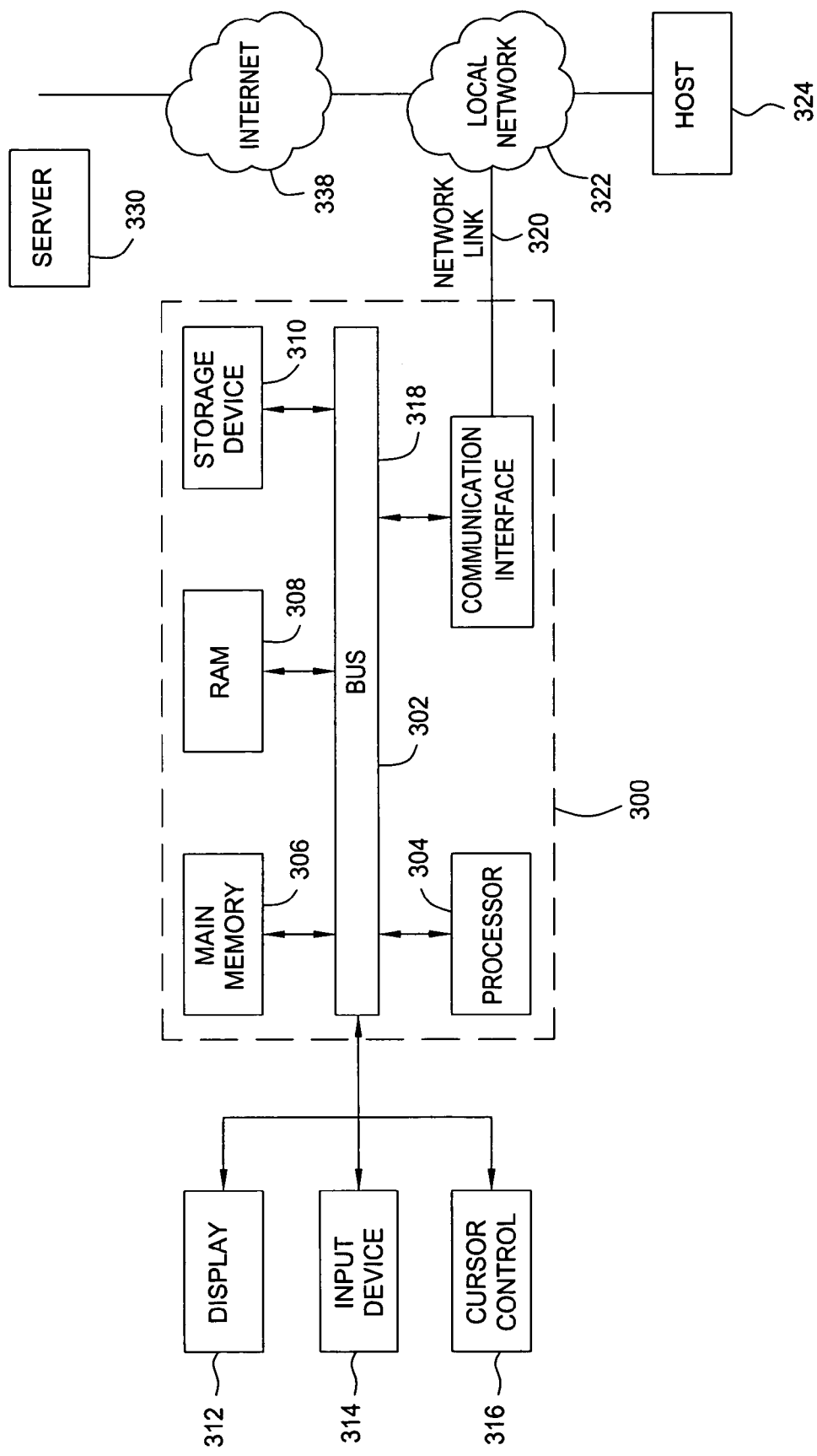
FIG. 3 is a conceptual diagram of a computing device that may be configured to implement the method steps of FIG. 1, according to one embodiment of the invention.

FIG. 3 is a conceptual diagram of a computing device 300 that may be configured to implement the method steps of FIG. 1, according to one embodiment of the invention. Computing device 300 may be any type of computing device such as, for example, a desktop computer, a laptop computer, a server machine, a set-top box, a game system or console, a personal digital assistant or a cellular phone. As shown, computing device 300 includes, without limitation, a bus 302 for communicating information and a processor 304 coupled to bus 302 for processing information. Computing device 300 also includes a main memory 306, such as a random access memory or other dynamic storage device, for storing information and instructions to be executed by processor 304. For example, the geometry kernel application referenced above in conjunction with FIG. 1 may reside within main memory 306, and processor 304 may execute the instructions for implementing the matched contour method described herein. Processor 304 may be a central processing unit (CPU), a graphics processor, some other type of special-purpose processor, or a hardware state machine with special-purpose logic dedicated to implementing only the functionality of the photon distribution algorithm.

Computing device 300 may be coupled via bus 302 to a display 312 for displaying information to a user. An input device 314, including alphanumeric and other keys, is coupled to bus 302 for communicating commands and other information to processor 304. Another type of user input device is a cursor control 316, such as a mouse, trackball or direction keys, for communicating command selections and direction information to processor 304 and for controlling cursor position and movement on display 312. Computing device 300 also may include a communication interface 318 coupled to bus 302 that provides access to a local network 322 via a network link 320. Local network 322 may, in turn, couple computing device 300 to a host computer 324 or other device on local network 322, or may couple computing device 300 to more remote devices, such as server 330, through a wide area network, such as Internet 328.

By providing for the creation of matched contour wires that may adapt to changes in the shape of a solid part, embodiments of the invention allow a user to create models that are less prone to failure. As the shape of the solid part changes, the matched contour profile automatically adapts to the new shape of the solid part. Thus, the user avoids having to correct aspects of a given solid part generation process each time the underlying solid part is altered in some fashion.

While the foregoing is directed to embodiments of the present invention, other and further embodiments of the invention may be devised without departing from the basic scope thereof, and the scope thereof is determined by the claims that follow.

The invention claimed is:

1. A method for generating a matched contour profile for a solid part, the method comprising:
   trimming or extending an input wire to create a modified input wire, wherein terminating vertices of the modified input wire coincide with a face of the solid part;
   slicing the solid part with a plane in which the input wire is defined to generate an intersection wire;
   identifying a matched contour face including at least one edge of the modified input wire and at least one edge of the intersection wire; and
   extracting edges of the identified matched contour face to create a closed wire representative of a matched contour profile.

2. The method of claim 1, wherein trimming the input wire comprises performing a Boolean subtraction to trim the input wire at a point where the input wire intersects a face of the solid part.

3. The method of claim 1, wherein extending the input wire comprises performing a Boolean addition to extend the input wire to a point where the input wire intersects a face of the solid part.

4. The method of claim 1, wherein identifying the matched contour face comprises analyzing a planar relationship between the modified input wire and the intersection wire.

5. The method of claim 1, further comprising the step of imprinting the modified input wire and the intersection wire on a disk to create one or more faces of interest.

6. The method of claim 1, further comprising the step of performing a modeling operation selected from at least an extrusion, a revolution, a translation, and a rotation operation, using the closed wire.

7. A system for generating a matched contour profile for a solid part, the system comprising:
   a memory; and
   a processor configured to perform the steps of:
      trimming or extending an input wire to create a modified input wire,
         wherein terminating vertices of the modified input wire coincide with a face of the solid part,
      slicing the solid part with a plane in which the input wire is defined to generate an intersection wire,
      identifying a matched contour face including at least one edge of the modified input wire and at least one edge of the intersection wire, and
      extracting edges of the identified matched contour face to create a closed wire representative of a matched contour profile.

8. The system of claim 7, wherein trimming the input wire comprises performing a Boolean subtraction to trim the input wire at a point where the input wire intersects a face of the solid part.

9. The system of claim 7, wherein extending the input wire comprises performing a Boolean addition to extend the input wire to a point where the input wire intersects a face of the solid part.

10. The system of claim 7, wherein identifying the matched contour face comprises analyzing a planar relationship between the modified input wire and the intersection wire.

11. The system of claim 7, wherein the steps further comprise imprinting the modified input wire and the intersection wire on a disk to create one or more faces of interest.

12. The system of claim 7, further comprising the step of performing a modeling operation selected from at least an extrusion, a revolution, a translation, and a rotation operation, using the closed wire.

13. A computer-readable medium storing instructions that, when executed by a processor, cause a computing device to generate a matched contour profile for a solid part, by performing the steps of:
   trimming or extending an input wire to create a modified input wire, wherein
      terminating vertices of the modified input wire coincide with a face of the solid part;
   slicing the solid part with a plane in which the input wire is defined to generate an intersection wire;
   identifying a matched contour face including at least one edge of the modified input wire and at least one edge of the intersection wire; and
   extracting edges of the identified matched contour face to create a closed wire representative of a matched contour profile.

14. The computer-readable medium of claim 13, wherein trimming the input wire comprises performing a Boolean subtraction to trim the input wire at a point where the input wire intersects a face of the solid part.

15. The computer-readable medium of claim 13, wherein extending the input wire comprises performing a Boolean addition to extend the input wire to a point where the input wire intersects a face of the solid part.

16. The computer-readable medium of claim 13, wherein identifying the matched contour face comprises analyzing a planar relationship between the modified input wire and the intersection wire.

17. The computer-readable medium of claim 13, wherein the steps further comprise imprinting the modified input wire and the intersection wire on a disk to create one or more faces of interest.

18. The computer-readable medium of claim 13, wherein the steps further comprise performing a modeling operation selected from at least an extrusion, a revolution, a translation, and a rotation operation, using the closed wire.

* * * * *